United States Patent
Meyer et al.

(10) Patent No.: US 6,793,581 B2
(45) Date of Patent: Sep. 21, 2004

(54) VENTING SOLUTION FOR CONSTANT VELOCITY JOINT

(75) Inventors: Erik Meyer, Chesterfield Township, MI (US); Joachim Proelss, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 09/738,714

(22) Filed: Dec. 15, 2000

(65) Prior Publication Data

US 2002/0077185 A1 Jun. 20, 2002

(51) Int. Cl.[7] .............................................. F16D 3/224
(52) U.S. Cl. ......................... 464/15; 464/17; 464/906
(58) Field of Search .................... 464/7, 15, 11, 464/17, 133, 906, 145, 903; 277/928, 946; 96/6

(56) References Cited

U.S. PATENT DOCUMENTS

| | | | | |
|---|---|---|---|---|
| 2,354,961 A | * | 8/1944 | O'Donnell | 464/133 X |
| 3,962,889 A | * | 6/1976 | Stillwagon, Jr. | 464/11 |
| 4,187,390 A | * | 2/1980 | Gore | |
| 4,319,467 A | | 3/1982 | Hegler | |
| 4,820,238 A | * | 4/1989 | Uchida et al. | 464/15 |
| 5,416,657 A | * | 5/1995 | Beck et al. | |
| 5,741,186 A | * | 4/1998 | Tatsuno | 464/25 |
| 6,010,409 A | | 1/2000 | Johnson | |
| 6,139,216 A | * | 10/2000 | Bertetti | 464/906 X |
| 6,220,967 B1 | * | 4/2001 | Miller | 464/906 X |
| 6,322,452 B1 | * | 11/2001 | Kondo | 464/17 |
| 6,530,843 B2 | * | 3/2003 | Miller et al. | 464/145 |
| 2002/0025854 A1 | * | 2/2002 | Miller et al. | 464/15 |

* cited by examiner

Primary Examiner—Greg Binda
(74) Attorney, Agent, or Firm—Jennifer M Brumbaugh; Mick A. Nylander

(57) ABSTRACT

A constant velocity joint for use with an automotive vehicle. The constant velocity joint includes an outer race and an inner race supported within the outer race. The constant velocity joint includes a cover, wherein that cover creates a barrier between a lubricant and the atmosphere. The constant velocity joint also includes a permeable membrane adjacent to the cover.

10 Claims, 4 Drawing Sheets

VENTING SOLUTION FOR CONSTANT VELOCITY JOINT

TECHNICAL FIELD

The present invention relates to constant velocity joints, and more particularly, relates to a venting solution for constant velocity joints.

BACKGROUND ART

Constant velocity joints are common components in automotive vehicles. Typically, constant velocity joints are employed where transmission of a constant velocity rotary motion is desired or required. The common types of constant joints are a plunging tripod, a fixed tripod, plunging ball joint and a fixed ball joint. These types of joints currently are used in front wheel drive vehicles, rear wheel drive vehicles, and on the propeller shafts found in rear wheel drive, all-wheel drive and four wheel drive vehicles. The plunging constant velocity joints will allow for axial movement during operation without use of slip-spines, which sometimes initiate forces that result in vibration and noise. These constant velocity joints are generally grease lubricated for life and sealed by an elastomeric sealing boot when used on drive shafts. Thus, constant velocity joints are sealed in order to retain grease inside the joint while keeping contaminants and foreign matter, such as dirt and water, out of the joint. To achieve this protection the constant velocity joint is usually enclosed at the opened end by a sealing boot made of a rubber, thermoplastic or silicone. The opposite end of the outer race generally is enclosed by a dome or cap, known as a grease cap in the case of a "disc" type of joint. A monoblock or integral stem and race design style joint is sealed by the internal geometry of the outer race. This sealing and protection of the joint is necessary because contamination of the inner chamber of the joint is undesirable.

During operation, the constant velocity joint creates internal pressures in the chamber of the outer joint. These pressures have to be vented to the outer atmosphere in order to prevent pressure build up which occurs during the operation of the joint and may affect the performance and life of the boot. If a pressure build up is allowed to reach a critical state within the boot, the boot may rupture or crack causing a loss of the seal. Generally speaking, a constant velocity joint is usually vented by placing a small hole in the center of the grease cap or at least one hole around the outer periphery of the outer race. These prior methods of venting pressure or gas are sometimes less effective because if the constant velocity joint is in the static state (not rotating) the lubricating grease may settle in the vent hole and block or hinder its function of venting any internal gas pressure. Furthermore, the constant velocity joint, after running for long periods of time, creates very high temperatures along with the high pressures. These high temperatures may be reduced by venting gas through the current vent holes. However, if the constant velocity joint is submerged or saturated in water or other contaminants, the water may, via vacuum, enter into the constant velocity joint thus contaminating the grease lubricant and possibly reducing the life of the constant velocity joint. Therefore, the ingress of water and other contaminants through the vent hole may reduce life expectancy of the constant velocity joint.

Therefore, there is a need in the art for a constant velocity joint that is able to vent the internal pressure gas build-up while keeping contaminants from entering the constant velocity joint through the venting mechanism.

BRIEF SUMMARY OF THE INVENTION

An object of the present invention is to provide a venting solution for a constant velocity joint.

Yet a further object of the present invention is to provide a vent for a constant velocity joint that has a permeable membrane to the atmosphere.

Yet a further object of the present invention is to prevent the entry of contaminants into the constant velocity joint internal chamber while allowing the venting of pressurized gas from the inside of the constant velocity joint chamber.

Yet a further object of the present invention is to provide a vent for a constant velocity joint with minimal increase in cost and manufacturing time.

To achieve the foregoing objects the constant velocity joint for use in a vehicle includes an outer race. The constant velocity joint also includes an inner race supported within the outer race. The constant velocity joint further includes a cover wherein that cover creates a barrier between a lubricant and the atmosphere. The constant velocity joint also includes a permeable membrane adjacent to the cover.

One advantage of the present invention is that the constant velocity joint includes a vent that has a permeable membrane to the atmosphere.

A further advantage of the present invention is that the constant velocity joint vent system allows gas, which is under pressure, to escape from the internal joint chamber to the atmosphere and allows gas to enter from the atmosphere to the internal chamber.

A further advantage of the present invention is providing constant velocity joint vent will stop the entry of contaminants into the constant velocity joint.

Other objects, features and advantages of the present invention will become apparent from the subsequent description and appended claims, taken in conjunction with the accompanying drawings.

BEST MODE FOR CARRYING OUT THE INVENTION

Figure 1:
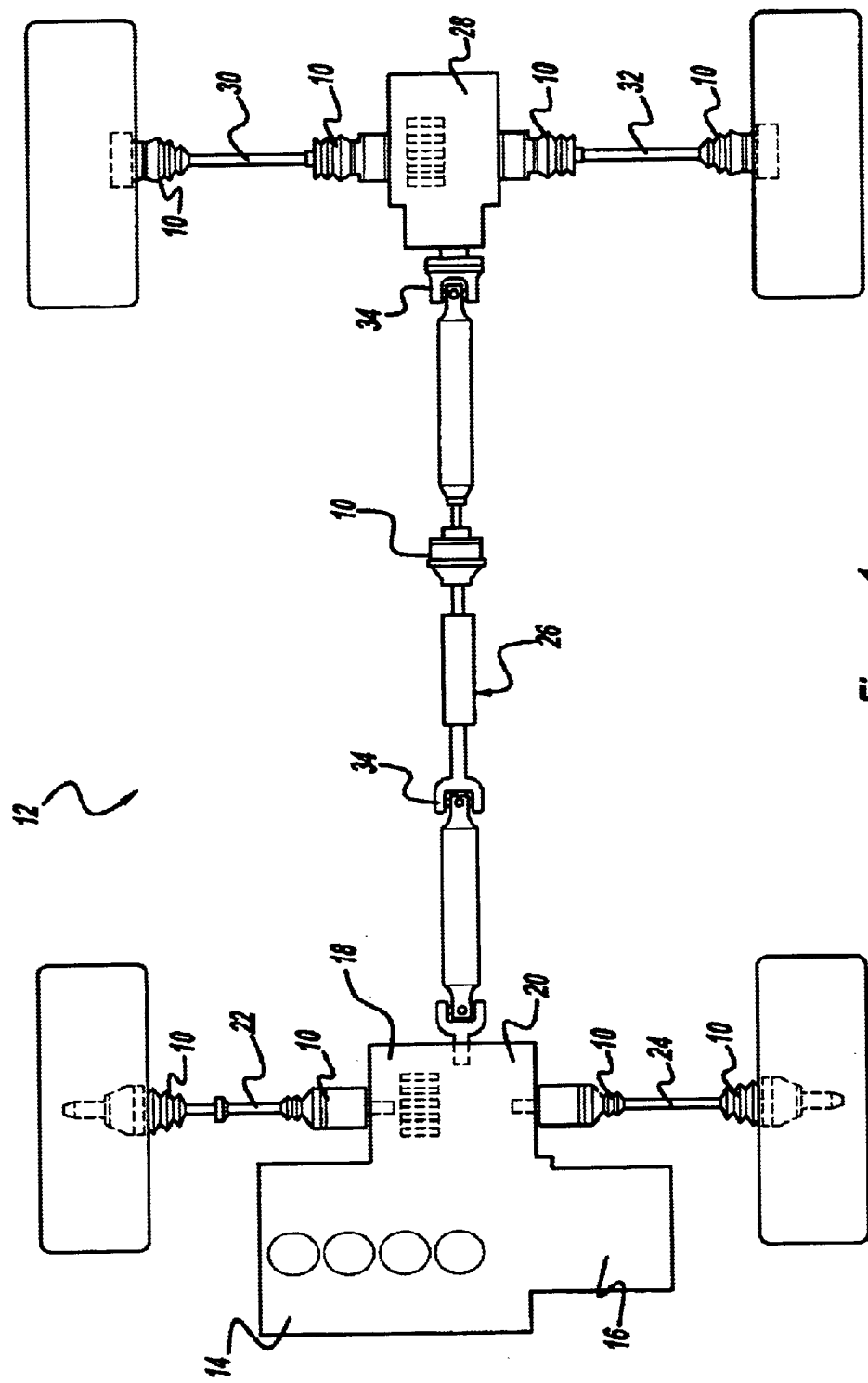
FIG. 1 shows a plan view of an all wheel drive vehicle drive line.
Figure 2:
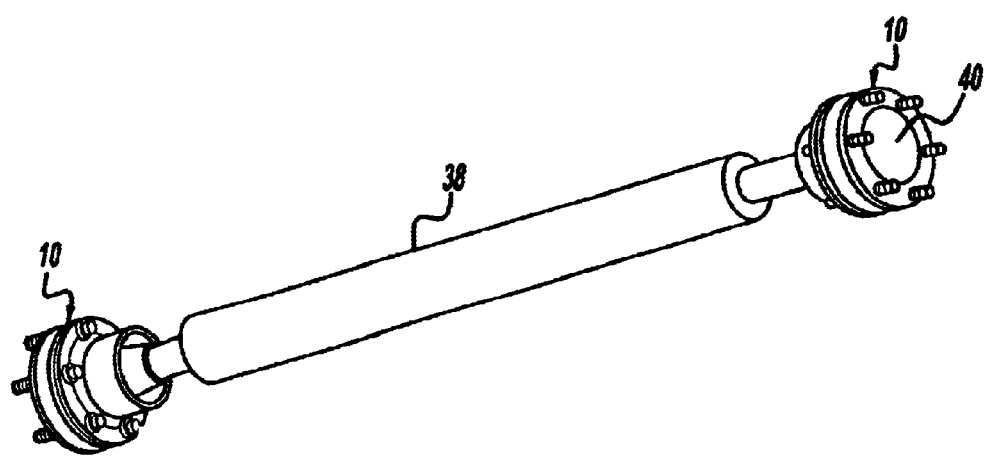
FIG. 2 shows a plan view of a prop shaft with a pair of constant velocity joints.

Referring to FIGS. 1 and 2, a constant velocity joint 10 according to the present invention is shown. It should be noted that all types of constant velocity or universal joints such as plunging tripod, fixed tripod, etc., which may require venting, may also be used with the present invention. The constant velocity joint 10 includes a novel and improved method of venting the constant velocity joint.

FIG. 1 shows a typical drive line 12 of an automotive vehicle. The drive line shown in FIG. 1 is a typical all-wheel drive vehicle driveline, however it should be noted that the constant velocity joints 10 of the current invention may also be used on rear wheel drive vehicles, front wheel drive vehicles, all wheel drive, and four wheel drive vehicles. The drive line 12 includes an engine 14 that is connected to a transmission 16 and a power take off unit 18. The front differential 20 has half shaft assembly 22 and a half shaft assembly 24 each of which are connected to a wheel and deliver power to the wheels. On both ends of the half shaft assembly 22 and the half shaft assembly 24 are constant velocity joints 10. A propeller shaft 26 connects the front differential 20 to the rear differential 28, wherein the rear differential 28 includes a half shaft assembly 30 and a half shaft assembly 32 each of which is connected to a wheel. A constant velocity joint 10 is located on both ends of the half shaft assembly 30, 32 that connect to the wheel and the rear differential 28. The propeller shaft 26, shown in FIG. 1, is a three piece propeller shaft 26 that includes a plurality of Cardan joints 34 and one high speed constant velocity joint 10. The constant velocity joints 10 transmit power to the wheels through the half shaft assemblies 30, 32 even if the wheels or the shafts have changing angles due to steering or raising or lowering of the suspension of the vehicle. The constant velocity joints 10 may be of any of the standard types known such as the plunging tripod type, the cross groove joint type, a fixed joint, a fixed tripod joint, or double off set joint all of which are commonly known terms in the art for different varieties of constant velocity joints 10. The constant velocity joints 10 allow for transmission of constant velocities at angles which are found in every day driving of automotive vehicles in both the half shaft assembly and prop shaft assembly of these vehicles.

Figure 4:
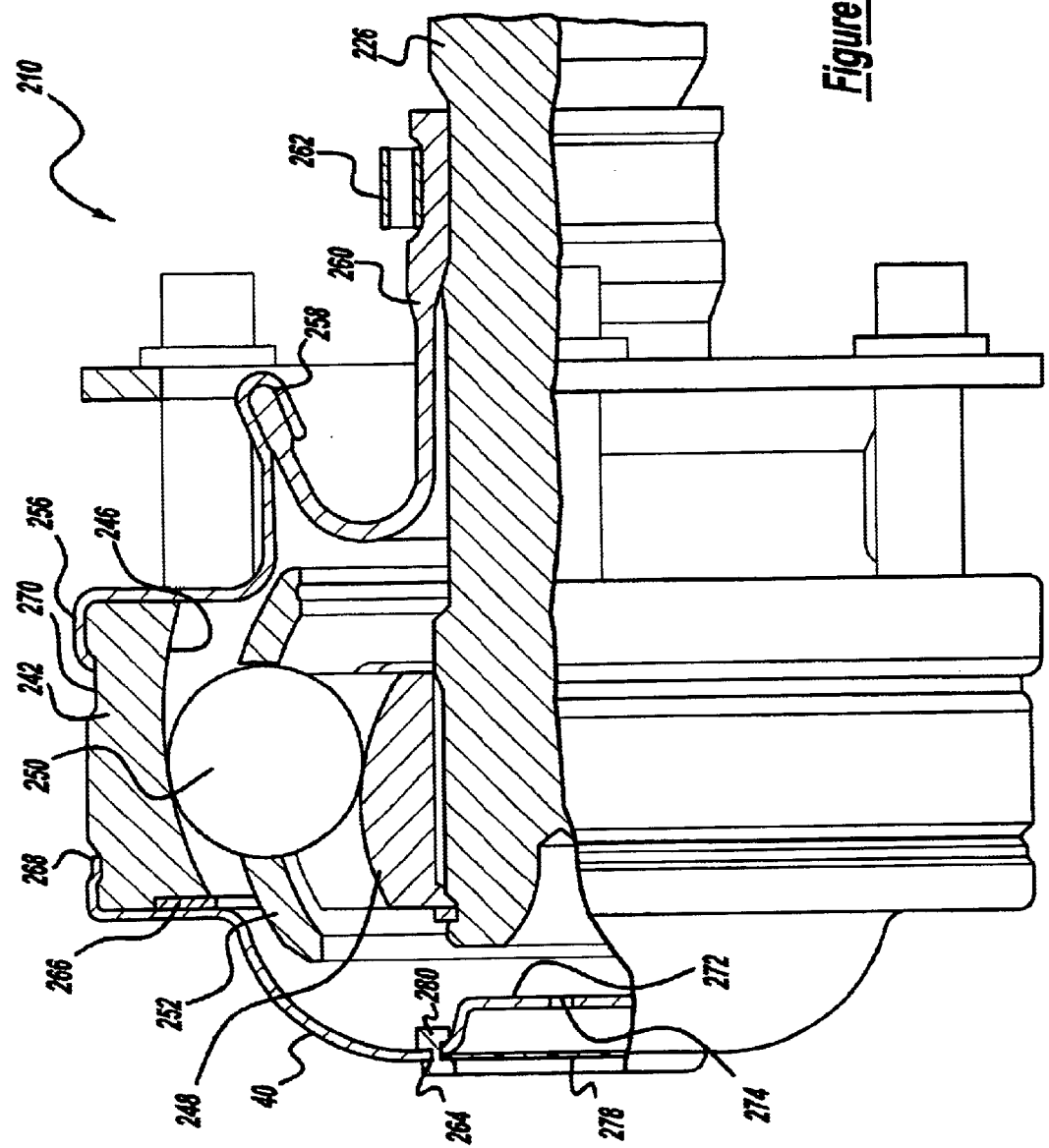
FIG. 4 shows a cross section of an alternate embodiment of the constant velocity joint of the present invention.

FIG. 2 shows a typical propeller shaft 38 that includes two high speed constant velocity joints 10. Constant velocity joints 10 may include end caps 40, as shown in FIG. 4, which are used to seal the joint. The constant velocity joints 10 are connected to other parts of the prop shaft or onto driving gears taking off from both the front differential and rear differential. Other types of setups using propeller shafts 38 may also be used depending on the requirements of the car, such as all wheel drive, four wheel drive, "on demand" all wheel drive, etc. The constant velocity joints 10 used on the prop shaft 38 or other shafts generally allow for the prop shaft 38 to operate at drive angles without the vibrations that tend to occur in shafts equipped with non constant velocity joints.

Figure 3:
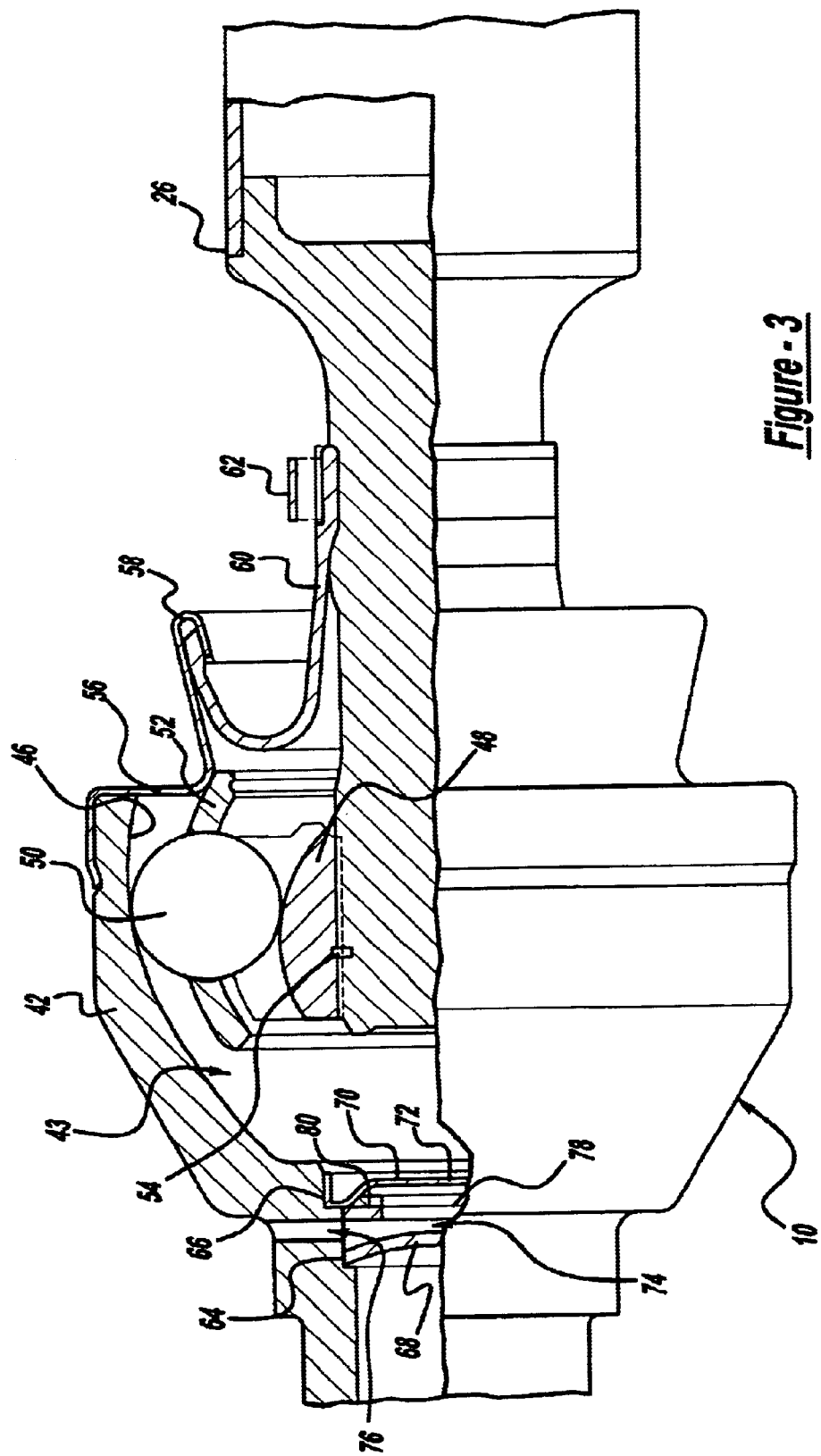
FIG. 3 shows a cross section of a constant velocity joint according to the present invention.

FIG. 3 shows the preferred embodiment of the current invention. The constant velocity joint 10 is a fixed constant velocity joint which is generally used in the prop shaft 26 in an all wheel drive vehicle. It should be noted that any other type of constant velocity joint may also be used. The constant velocity joints 10 include an outer race 42 with an inner wall 46 generally defining the constant velocity joint chamber 43. An inner race 48 is located or housed within the outer race 42. The inner race 48 is connected to the drive shaft or prop shaft 26 of the vehicle. A ball or rolling element 50 is located between an outer surface of the inner race 48 and the inner wall 46 of the outer race 42. The ball 50 is held in position between the outer race 42 and inner race 48 surfaces by a cage 52. Each ball 50 is located within an indentation of the outer race inner surface 46. The constant velocity joint 10 allows the operating angle of the joint 10 to change.

A ring or snap retainer 54 is located on an inside surface of the inner race 48 to allow for connection of the prop shaft 26 to the inner race 48. A boot cover 56 is connected to an outer surface of the outer race 42. One end of the boot cover 56 has a channel 58 that runs along the entire periphery of the boot cover 56. One end of a boot member 60, which in the preferred embodiment is made of a urethane, is secured within the channel 58 of the boot cover 56 while the other end engages the drive shaft 26 and is held in place by a boot clamp 62. The present invention contemplates the use of any other type of hard plastic or soft rubber like material for the boot. The boot 60 seals the constant velocity joint 10 from any outside contaminants, such as water, dirt and road grime.

An interior surface of the outer race 42 includes a first shoulder portion 64 and a second shoulder portion 66. The first shoulder portion 64 includes a first plug or cover 68 which is generally made of a metal material and seals the outer race 42 and chamber 43 from transmission oils or contaminants from the transmission. In contact with the second shoulder 66 of the outer race is a second plug or cover 70 which in the preferred embodiment is made of metal, but may be made of any other type of hard ceramic, or plastic or metal material depending on the design requirements. The second plug 70 includes an orifice 72 at a center thereof which allows for venting of the hot internal gases created during operation of the constant velocity joint 10. The first plug 68 and the second plug 70 form a second chamber 74 adjacent to the first chamber 43 formed by the outer race of the constant velocity joint 10. A second orifice 76 is located through the outer race 42 to vent the second chamber 74 to the atmosphere or outside air. This allows the gas to pass through the second plug 70 to be vented to the atmosphere through the second orifice 76 which is located through the outer race surface. Located adjacent to the second plug 70 and between the first and second plug within the second chamber 74 is a permeable membrane 78. The permeable membrane 78 is held in position by a clamping system 80, which in the preferred embodiment is a metal clamping system which is connected to the inner wall of the second chamber and holds the permeable membrane 78 securely within the second chamber between the first and the second plugs. It should be noted that the membrane 78 can be molded, pressed, etc out of many other materials such as plastics, nylons, ceramics, rubber, etc. The permeable membrane 78 must allow gas to vent from the internal chamber 43 of the constant velocity joint to the atmosphere, and vice versa, but not allow the ingress of contaminants into the joint 10 from the outside atmosphere such as water, grime, and the like.

In operation the constant velocity joint 10 is filled with a lubricant to reduce the internal temperature and lubricate the moving parts within the constant velocity joint 10. In the preferred embodiment the lubricant is a grease which is placed within the inner chamber 43 of the constant velocity joint 10 and is sealed thereafter via the boot cover 56 and urethane boot 60. The second plug 70 generally keeps the grease from contacting the permeable membrane 78 by only having the small orifice 72 which allows for the venting of the gas through the second chamber 74 and the second orifice 76 to the outside atmosphere. The membrane 78 is generally a fluorocarbon polymer membrane that repels water and contaminants, but allows gaseous air like substances to pass through. In the preferred embodiment the membrane 78 is made of an expanded polytetrafluoroethylene polymer that is saturated with an oleophobic polymer to create such a barrier. Therefore, the use of the permeable membrane 78 will allow for the heated gas in the internal chamber 43 to pass through which will equalize any internal pressures but prevent the entry of contaminants such as water and road grime into the constant velocity joint chambers 43 and 74.

FIG. 4 shows an alternate embodiment of the constant velocity joint 210. The constant velocity joint 210 includes an outer race 242 that has an inner race 248 located within its circumference. The inner race 248 is connected to a shaft 226. A ball 250 is in contact with both the inner surface of the outer race 242 and an outer surface of the inner race 248.

The ball 250 is held in place by a cage 252. On one end of the outer race 242 is located an end cap 40 which is made of metal and includes an orifice 264 at a center portion thereof A seal 266 which is preferably made of a cork material, however it should be noted that any other type of material may be used, is located between the end cap 40 and the outer race surface 242. The outer race surface 242 also includes two grooves 268 and 270 therein. The first groove 268 receives an end of the end cap 40 and allows for crimping of the end cap 40 onto the outer race 242. On the opposite end of the outer race 242 is located the boot cover 256 which is crimped into the second groove 270 on the outer race outer surface. The boot cover 256 includes a channel 258 on a periphery thereof. Within the channel 258 is located one end of the boot 260 which is made of a neoprene material, however, it should be noted that any other type of soft rubber like or composite material may also be used. The opposite end of the boot 260 is secured to the shaft 226 by a clamp 262 or other available securing methods.

Connected to the end cap 40 is a cover or plug 272 that generally has a U-shaped cross section. The cover 272 includes an orifice 274, which prevents contact of the internal lubricant of the constant velocity joint 210 from leaking out of the constant velocity joint 210. Directly adjacent to the cover 272 is a permeable membrane 278, which is connected to the end cap 40 via a clamping mechanism 280. The cover 272 and permeable membrane 278 defines a chamber. The permeable membrane 278 extends across or covers the orifices 264, 272. The permeable membrane 278 allows gas to pass through from the internal chamber and from the atmosphere to the internal chamber, but prevent the ingress of contaminants such as water and road grime into the internal chamber and lubricant of the constant velocity joint 210. The preferred lubricant is grease and is placed within the chamber defined by the outer race 242. The permeable membrane 278 is generally parallel with the outer circumference and surface of the end cap 40. The permeable membrane 278 is the same as that described above and provides the same function. The cover 272 that is attached to the end cap 40 prevents the grease lubricant from contacting the permeable membrane 278 and insures that the permeable membrane 278 allows venting of the gas from the internal chamber to the atmosphere.

When in operation, constant velocity joints 10 create high temperatures and high pressures from the rotation of the joints at high speeds. The venting of the high pressure gas reduces the internal temperature and creates longer life for the boot member 60. The present invention prevents water and contaminants from entering in the chamber of the constant velocity joint 10 while allowing the high pressure internal gas to vent to the atmosphere. Prior art constant velocity joints have different methods of venting the high pressure gas of constant velocity joints, however if the vehicle was ever submerged in water or saturated in water or other contaminants, the water may be sucked into the chambers of the constant velocity joint 10 via the vent holes and back pressure. The present invention overcomes these problems by using a permeable membrane 278 that does not allow water or contaminants to enter but allows the venting of the high pressure, high temperature gas.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A constant velocity joint comprising:
    an outer race;
    an inner race supported within said outer race;
    a fastening member arranged within said orifice, said fastening member having an outer surface in contact with said end cap;
    a cover secured to an inside surface of said fastening member, whereby said cover creates a barrier between a lubricant and the atmosphere; and
    a permeable membrane contacting said cover and said inside surface of said fastening member, whereby said membrane extends across said orifice in said end cap, said permeable membrane and said cover define a chamber.

2. The constant velocity joint of claim 1 wherein said cover includes an orifice therein, said orifice is located at a center point of said cover.

3. The constant velocity joint of claim 1 wherein said membrane is a fluorocarbon polymer.

4. The constant velocity joint of claim 3 wherein said membrane is an expanded polytetrafluoroethylene.

5. The constant velocity joint of claim 1 wherein said membrane allows gas to vent and repels contaminants.

6. The constant velocity joint of claim 1 wherein said membrane is arranged within said fastening member.

7. A constant velocity joint for use in a vehicle propeller shaft or half shaft assembly, said constant velocity joint including:
    an outer race;
    an inner race supported within said outer race;
    a rolling element positioned between said inner race and said outer race;
    a cage in contact with said rolling element;
    a boot cover connected to one end of said outer race;
    a shaft engaging said inner race;
    a boot in contact with said boot cover on one end thereof and in contact with said shaft on a second end thereof;
    a first plug contacting a first shoulder of said outer race;
    a second plug having an orifice, said second plug contacting a second shoulder of said outer race; and
    a permeable membrane arranged between said first plug and said second plug, wherein said permeable membrane extends at least a width of said orifice in said second plug.

8. The constant velocity joint of claim 7 wherein said permeable membrane is a fluorocarbon polymer.

9. The constant velocity joint of claim 7 wherein said membrane vents gas and repels contaminants.

10. The constant velocity joint of claim 7 wherein said first plug and said second plug define in part a chamber.

* * * * *

UNITED STATES PATENT AND TRADEMARK OFFICE
CERTIFICATE OF CORRECTION

PATENT NO.    : 6,793,581 B2
DATED         : September 21, 2004
INVENTOR(S)   : Erik Meyer and Joachim Proelss It is certified that error appears in the above-identified patent and that said Letters Patent is hereby corrected as shown below:

Column 6,
Line 12, after "...within said outer race;"
Line 13, insert -- an end cap having an orifice defined therein; --

Signed and Sealed this

First Day of February, 2005

JON W. DUDAS
*Director of the United States Patent and Trademark Office*